United States Patent Office 2,970,132
Patented Jan. 31, 1961

2,970,132

METHOD OF REACTING HETEROCYCLIC NITROGEN BASE POLYMERS WITH QUATERNIZING AGENT AND METAL OXIDE AND PRODUCT RESULTING THEREFROM

William B. Reynolds and James E. Pritchard, Bartlesville, Okla., assignors to Phillips Petroleum Company, a corporation of Delaware No Drawing. Filed May 20, 1955, Ser. No. 510,034

16 Claims. (Cl. 260—86.1)

This invention relates to thermosetting polymeric compositions and a method for producing them. In one aspect it relates to thermosetting polymeric compositions free from ethylenic carbon-to-carbon double bonds. In another aspect it relates to compositions produced by thermosetting of heterocyclic nitrogen base polymers, i.e., homopolymers, and copolymers with other monovinyl compounds, and which polymers are free from said carbon-to-carbon double bonds, in the presence of quaternizing agents and metal oxides. Such other compounding ingredients as desired, are also employed to modify processing and to impart desired properties to the finally cured product.

By our process heterocyclic nitrogen base polymers free from said carbon-to-carbon double bonds are converted into thermoset compositions having many characteristics of vulcanized compositions produced from said carbon-to-carbon double bonds containing polymers. The polymerizable heterocyclic nitrogen bases from which our polymers are prepared are those of the pyridine and quinoline series.

Conventional vulcanization procedures such as are used in processing ethylenic carbon-to-carbon double bond containing polymers, such as polybutadiene or butadiene-styrene copolymer rubbers, are inapplicable when applied to treatment of polymers free from ethylenic carbon-to-carbon double bonds, such as homopolymers of vinyl pyridines, or vinyl quinolines, and their copolymers with such other monovinyl compounds as the acrylates.

As far as we are aware no art teaches the curing of heterocyclic nitrogen base polymers by mixing such polymers with a quaternizing agent and a metal oxide and heating the mixture to effect the cure. Other more or less conventional compounding ingredients are sometimes added to the composition before curing. According to our procedure we are able to produce a cured heterocyclic nitrogen base composition free from the disadvantages characteristic of corrosive free-sulfur containing vulcanizates.

An object of our invention is to provide a method for curing homopolymers of polymerizable heterocyclic nitrogen bases and copolymers of these bases with other polymerizable monovinyl compounds, which are free from ethylenic carbon-to-carbon double bonds present in polymers of conjugated dienes.

Another object of our invention is to provide a method for curing polymerizable heterocyclic nitrogen base containing polymers.

Yet another object of our invention is to provide a thermosetting heterocyclic nitrogen base polymeric composition and a method for producing it.

Many other objects and advantages of our process and compositions will be obvious to those skilled in the art upon reading the following disclosure.

We accomplish these and other objects by mixing a quaternizing agent and a metal oxide into compositions of homopolymers of polymerizable heterocyclic nitrogen bases and copolymers of these compounds with polymerizable monovinyl compounds, and heating the mixtures to obtain cured products.

The terms "cure, cured, etc." are herein used to include both quaternizing and cross linking with metal oxides.

The polymerizable heterocyclic nitrogen base compounds of the pyridine and quinoline series which we use to produce our compositions include such compounds as 2-vinylpyridine, 5-methyl-2-vinylpyridine, 5-ethyl-2-vinylpyridine, 2-methyl-5-vinylpyridine, 2,5-divinylpyridine, 3-methyl-2,5-divinylpyridine, 4-methyl-3-vinylpyridine, 2-isopropenylpyridine, 5-propyl-2-isopropenylpyridine, 2-octyl-5-vinylpyridine, 2-vinylquinoline, 8-ethyl-2-vinylquinoline, 4-hexyl-5-vinylquinoline, 1-vinylisoquinoline, 5-methyl-1-isopropenylisoquinoline, 1,8-divinylisoquinoline, 2,5 - divinylquinoline, 6,7-dimethyl-2,5-divinylquinoline, etc. These specifically enumerated heterocyclic nitrogen base compounds are polymerizable and are used in preparing the thermosetting compositions of our invention.

The polymerizable heterocyclic nitrogen base component is employed in amounts in the range between 1 and 100 parts by weight of the total monomeric material.

The other polymerizable compounds which we use for copolymerization with the above disclosed polymerizable heterocyclic nitrogen bases are monovinyl compounds and monovinylidene compounds devoid of acidic groups and include esters of acrylic and methacrylic acids, e.g., methyl acrylate, ethyl acrylate, propyl acrylate, butyl acrylate, and the corresponding methacrylate, styrene, alpha-methyl styrene, various alkyl and alkoxy styrenes, acrylonitrile, methacrylonitrile, methyl vinyl ketone, methyl isopropyl ketone, methyl vinyl ether, vinyl acetate, and the like. Esters of acrylic acid and methacrylic acid are particularly useful in the preparation of our compositions. Other polymerizable materials such as vinyl chloride, vinylidene chloride, halogen-substituted esters of acrylic acid and methacrylic acid, halogen-substituted styrene, etc., are employed in the production of the copolymers and are considered to be within the scope of this invention. It is to be understood that mixtures of polymerizable heterocyclic nitrogen bases as well as mixtures of these other materials copolymerizable with the heterocyclic nitrogen bases are also used in preparing the polymers.

Quaternizing agents which are used in producing the thermosetting compositions herein described are those which contain an active halogen atom attached to a carbon atom in a compound which is not an acid. Such halogen containing quaternizing agents are the various alkyl halides, and include methyl iodide, methyl bromide, ethyl iodide, propyl iodide, hexyl iodide, nonyl bromide, cetyl bromide; the various alkylene halides such as ethylene iodide, ethylene bromide, propylene chloride, butene bromide, octene bromide; the various substituted alkanes and cycloalkanes necessarily including the above alkyl and alkylene halides, which contain at least one hydrogen atom attached to a carbon atom, such as bromoform, chloroform, 1,2-dichloropropane, 1,2-dibromobutane, ethylene chlorohydrin, acetyl chloride, iodoform, chloroacetyl chloride; and the various substituted aromatic compounds such as picryl chloride, benzoyl chloride, phenyl chloride, benzene sulfonyl chloride, benzyl chloride, benzal chloride, and benzotrichloride. Other materials which are employed as quaternizing agents in the practice of this invention are the various polyhalogenated cycloalkenes such as hexachlorocyclopentadiene. The foregoing enumeration is not intended to include all the possible suitable quaternizing agents, but is only representative since many others are also used. If an organic compound contains an active halogen atom attached to a carbon atom and if the compound is not an acid, it is a useful quaternizing agent according to our invention. In general, active quaternizing agents such as organic halides, and the like, which contain not more than 20 carbon atoms per molecule and contain at least one halogen or equivalent quaternizing group; for example, an aryl alkylhalide, or the like, are also used in the practice of this invention for the production of thermosetting polymer from copolymers of said other polymerizable monovinyl compound and a copolymerizable heterocyclic nitrogen base. Those compounds which contain the configuration

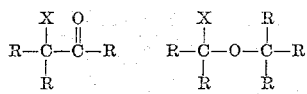

wherein X is a halogen atom such as chlorine, bromine and iodine and the R's represent oxygen, hydrogen or carbon valence linkages to their respective carbon atoms, are especially useful.

In effecting the quaternization reaction to produce these thermosetting polymeric materials it is pointed out that the nitrogen atoms of the heterocyclic base nuclei (units) in the resulting solid material have their five valence bonds attached to atoms (or radicals) other than a hydrogen atom, such as four nitrogen to carbon bonds and one nitrogen to halogen bond. In other words the available valences of the nitrogen atoms contained in the polymerized heterocyclic base nuclei of the polymer are satisfied by a radical other than by a hydrogen atom.

The reaction of the polymerizable heterocyclic nitrogen base polymer with the quaternizing agent yields a product which contains these characteristic nitrogen valencies in the recurring nitrogen base units of the polymers. In distinction, if a pyridine portion of the polymer were reacted with an acid acting substance (mineral acid, organic acid or the like) one of the two available nitrogen valencies would be satisfied by bonding to a hydrogen atom and accordingly would not be a quaternary compound of the type contemplated. The quaternary salts tend to be less water soluble whereas pyridinium salts formed by reaction with an acid acting compound (whereby a hydrogen atom attaches to a nitrogen atom) tend to be more water soluble. Furthermore, the quaternizing reaction of this invention is readily controlled since it proceeds rather slowly. Pyridinium or quinolinium salts (other than a quaternary salt) form free pyridine or quinoline, water and a salt when reacted with a strong base while the corresponding quaternary salts do not react in this manner. Suitable quaternizing agents are therefore those compounds which when reacted with the nitrogen atom of the heterocyclic base nucleus do not attach or link a hydrogen atom thereto. Expressed differently the quaternizing agents of this invention are those compounds XY which react with the nitrogen atoms of the heterocyclic base nuclei of the polymer or with a compound such as pyridine or quinoline to yield a material which can be characterized by the formulas

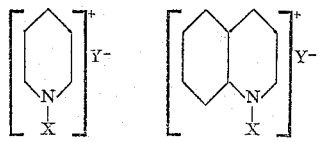

wherein X represents a molecular fragment, such as an organic radical (and other than hydrogen) and Y is the halogen atom.

The amount of quaternizing agent employed will generally be in the range between 2 and 100 mol percent based on the basic nitrogen units in the polymer. The amount of quaternizing agent employed in any particular case will depend largely upon the type of product desired.

Metal oxides which are most frequently preferred are those of lead (litharge), zinc, and magnesium. Other metal oxides which are applicable include those of cadmium, mercury, tin, calcium, barium, strontium, vanadium, manganese, iron, cobalt, and nickel, and mixtures of any two or more of these oxides.

The amount of metal oxide used will generally be in the range between 0.5 and 200 parts by weight per 100 parts of the polymeric material.

Homopolymers of polymerizable heterocyclic nitrogen bases and copolymers of these with other polymerizable monovinyl compounds can range from liquid to rubbery, to resinous materials depending upon the substances polymerized and the method of polymerization. These polymers have many desirable properties but, since they lack the olefinic unsaturation present in polymers of conjugated dienes, they are difficult to cure by conventional procedures. This invention provides a process for curing polymers of polymerizable heterocyclic nitrogen bases which are free from ethylenic carbon-to-carbon double bonds and obtaining therefrom thermosetting compositions which range from elastomers to hard resins. This process differs from many of the widely used procedures in that no free sulfur containing curing agents is employed.

When operating in accordance with the process of this invention, a polymer of a polymerizable heterocyclic nitrogen base of the pyridine or quinoline series is treated with both a quaternizing agent and a metal oxide. Other compounding ingredients such as plasticizers, reinforcing agents, pigments, and the like are added, if desired. In one procedure, the quaternizing agent is first incorporated into the polymer, the mixture is heated or pre-cured to allow time for the quaternization reaction, the metal oxide is then added, together with any other compounding ingredients, and the mixture is again heated to effect the final cure. In an alternative procedure, both the quaternizing agent and the metal oxide are added simultaneously to the polymer, together with other compounding ingredients, and curing is then effected by heating. One convenient method is to add the various materials to the polymer on the mill and continue mixing until a homogeneous product is obtained. Upon heating, the mixture cures to a thermosetting composition. Curing temperatures are generally in the range between 150° and 450° F.

The process of this invention requires a quaternizing agent rather than an acid or acidic material. When such a material is incorporated into a heterocyclic nitrogen base polymer, a reaction occurs almost instantaneously, causing the polymer to become hard or to set up immediately, thus making any further processing difficult if not impossible. When a quaternizing agent is used, as in the present invention, the composition remains processable until curing is effected. The various ingredients can be incorporated on the mill, and the material is extruded or molded satisfactorily.

The products of this invention vary from elastomers to hard resins depending upon the nature of the polymeric starting materials and the quantities of quaternizing agent and metal oxide employed. In some instances it is desirable to effect only partial quaternization by using only a small amount of quaternizing agent and metal oxide and thereby obtain a composition in which a relatively large number of basic nitrogen groups remain in the final product. In other instances it is desirable to effect substantially complete quaternization of the polymer. Numerous variations in the properties of the final products are obtained by using the same polymeric starting material and varying the quantities of quaternizing agent and metal oxide. These products which are free from ethylenic carbon-to-carbon double bonds have high ozone and oil resistance.

Since the products have widely varying properties, they are suitable for many uses. They are useful as casting resins, as gasket stocks, and in the manufacture of extruded objects such as pipe. If the products contain unreacted basic nitrogen groups, they can be employed as ion exchange resins. Compositions which are fluid or pasty prior to curing, or which can be extruded when hot, are useful for sealing compositions.

*Example I*

A methyl acrylate, 2-methyl-5-vinylpyridine copolymer was prepared by emulsion polymerization at 41° F. in accordance with the following recipe:

| | Parts by weight |
|---|---|
| Methyl acrylate | 90 |
| 2-methyl-5-vinylpyridine | 10 |
| Water | 180 |
| Sodium fatty acid soap | 5 |
| $K_2S_2O_8$ | 0.3 |
| Mercaptan blend [1] | 0.45 |

[1] A blend of tertiary $C_{12}$, $C_{14}$, $C_{16}$ aliphatic mercaptans in the ratio of 3:1:1 parts by weight.

A conversion of 74 percent was reached in 26 hours.
A portion of the 90:10 copolymer was compounded using the following recipe:

| | Parts by weight |
|---|---|
| Methyl acrylate/2-methyl-5-vinylpyridine 90:10 copolymer | 100 |
| Benzothiazyl disulfide (Altax) | 0.75 |
| Stearic acid | 0.5 |
| Zinc oxide | 5 |
| Magnesium oxide | 4 |
| Benzal chloride | 10 |

The compounded stock was milled, and then cured at 320° F. for one hour. The final product had a tensile strength of 3200 p.s.i. and an elongation of 90 percent. It was a thermosetting resin.

Another portion of the above prepared 90:10 copolymer (100 parts) was compounded with 10 parts by weight of benzal chloride in the absence of a metal oxide. No other compounding ingredients were added. The mixture was heated 15 hours at 176° F. The material was still thermoplastic and could not be removed from the mold in a single piece.

*Example II*

A quantity of the 90:10 methyl acrylate: 2-methyl-5-vinylpyridine copolymer prepared in Example I was compounded in accordance with the following recipe:

| | Parts by weight |
|---|---|
| 90:10 copolymer | 100 |
| $TiO_2$ | 60 |
| Benzothiazyl disulfide (Altax) | 0.75 |
| Stearic acid | 0.5 |
| Zinc oxide | 5 |
| Magnesium oxide | 4 |
| Benzal chloride | 10 |

The compounded polymer was milled, and then cured at 320° F. for one hour. The final product had a tensile strength of 3430 p.s.i. and an elongation of 40 percent. A sample immersed in a 70 to 30 isooctane:toluene mixture for one week at 25° C. gave a volume percent swell of 3.5.

*Example III*

An 80:20 methyl acrylate:2-methyl-5-vinylpyridine copolymer was prepared by emulsion polymerization at 41° F. in accordance with the following recipe:

| | Parts by weight |
|---|---|
| Methyl acrylate | 80 |
| 2-methyl-5-vinylpyridine | 20 |
| Water | 180 |
| Sodium fatty acid soap | 5 |
| $K_2S_2O_8$ | 0.3 |
| Mercaptan blend [1] | 0.5 |

[1] As in Example I.

A conversion of 76 percent was reached in 26 hours.
Portions of this 80:20 copolymer were compounded using the following recipes:

| | Recipe (Parts by Weight) | |
|---|---|---|
| | I | II |
| 80:20 Copolymer | 100 | 100 |
| $TiO_2$ | 60 | 60 |
| Benzothiazyl disulfide (Altax) | 1.5 | 1.5 |
| Stearic acid | 1.5 | 1.5 |
| Zinc oxide | 5 | 5 |
| Magnesium oxide | 4 | 4 |
| Santicizer E-15 [1] | 10 | 10 |
| Benzal chloride | 0 | 10 |

[1] Ethyl phthalyl ethyl glycollate.

The compounded stocks were milled, and then heated at 320° F. for one hour. The recipe (I) which did not contain benzal chloride failed to cure. The sample compounded in accordance with Recipe II gave a thermosetting resin which was easily removed from the mold while hot. It had a tensile strength of 2060 p.s.i. and an elongation of 60 percent.

*Example IV*

An 80:20 methyl acrylate:2-methyl-5-vinylpyridine copolymer was prepared using the recipe given in Example III. Polymerization was effected at 41° F. and a conversion of 94 percent was attained in 22 hours. The polymer was compounded using the following recipe:

| | Parts by weight |
|---|---|
| 80:20 copolymer | 100 |
| $TiO_2$ | 60 |
| Benzothiazyl disulfide (Altax) | 1.5 |
| Stearic acid | 1.5 |
| Zinc oxide | 5 |
| Magnesium oxide | 4 |
| Benzal chloride | 20 |

Two different mixing procedures were used. In the first, the polymer and benzal chloride were mill mixed and the mixture then heated for one hour at 310° F. The remaining ingredients were then incorporated into the heated polymer-benzal chloride mixture by mill mixing and the final compounded stock was cured at 320° F. for one hour. In the second mixing procedure all ingredients were added on the mill at the same time. This stock was then cured at 320° F. for one hour. Tensile strength and elongation data are shown below.

| | Mixing Procedure | |
|---|---|---|
| | I | II |
| Tensile, p.s.i. | 3,750 | 2,835 |
| Elongation, percent | 25 | 20 |

The product resulting from the second mixing procedure was more brittle and less flexible than that obtained when the first mixing procedure was employed.

While stearic acid has been included in the above recipes, its use in our compounding recipes is not essential as it is in most other compounding recipes.

In the following example are given results of runs using benzyl chloride as the quaternizing agent with several different metal oxides to check their effect on properties of the final cured polymers. The recipes were similar to those given hereinabove except for the metal oxide and the quaternizing agent. The curing was carried out in the same manner.

Example V

| Run No. | Quaternizing Agent, Type | Amt., phr. | Metal oxide 10, phr. | Tensile | Percent Elongation | Percent Swell |
|---|---|---|---|---|---|---|
| 1 | | | | 540 | 480 | 5.3 |
| 2 | Benzyl chloride | 2.0 | | 1,120 | 80 | 7.2 |
| 3 | | | ZnO | 1,170 | 80 | 3.4 |
| 4 | Benzyl chloride | 2.0 | ZnO | 1,680 | 160 | 2.7 |
| 5 | ___do___ | 2.0 | PbO | 1,740 | 50 | 42.0 |
| 6 | ___do___ | 2.0 | MgO | 1,660 | 10 | 6.4 |
| 7 | ___do___ | 2.0 | Fe₂O₃ | 1,220 | 30 | 6.5 |

The herein disclosed vinylpyridines can be hemopolymerized and these vinylpyridines and the other vinyl monomers can be copolymerized in emulsion, solution or bulk to yield resins or elastomers which are free from ethylenic carbon-to-carbon double bonds. These polymers when cured according to the herein disclosed methods exhibit good physical properties for many purposes.

While certain embodiments of the invention have been described for illustrative purposes, the invention obviously is not limited thereto.

We claim:

1. A polymeric organic composition formed by reacting, in the absence of elementary free sulfur, a polymer selected from the group consisting of (a) a homopolymer of a polymerizable heterocyclic nitrogen base compound selected from the group consisting of vinyl substituted and isopropenyl substituted pyridines and quinolines, and nuclear alkyl substituted derivatives thereof wherein the nuclear alkyl substituent contains from 1 to 8 carbon atoms, and (b) copolymers of said heterocyclic nitrogen base compound with a monoethylenically unsaturated monomer copolymerizable therewith, with (1) at least one organic non-acid quaternizing agent capable of forming fourth and fifth valence bonds between the heterocyclic nitrogen atoms of said polymer and atoms other than hydrogen of said quaternizing agent, and (2) at least one metal oxide selected from the group consisting of lead, zinc, magnesium, cadmium, mercury, tin, calcium, barium, strontium, vanadium, manganese, iron, cobalt, and nickel oxides.

2. A method for producing a polymeric organic composition, which method comprises: reacting, in the absence of elementary free sulfur, a polymer selected from the group consisting of (a) a homopolymer of a polymerizable heterocyclic nitrogen base compound selected from the group consisting of vinyl substituted and isopropenyl substituted pyridines and quinolines, and nuclear alkyl substituted derivatives thereof wherein the nuclear alkyl substituent contains from 1 to 8 carbon atoms, and (b) copolymers of said heterocyclic nitrogen base compound with a monoethylenically unsaturated monomer copolymerizable therewith, with (1) at least one organic non-acid quaternizing agent capable of forming fourth and fifth valence bonds between the heterocyclic nitrogen atoms of said polymer and atoms other than hydrogen of said quaternizing agent, and (2) at least one metal oxide selected from the group consisting of lead, zinc, magnesium, cadmium, mercury, tin, calcium, barium, strontium, vanadium, manganese, iron, cobalt, and nickel oxides.

3. A composition according to claim 1 wherein said polymer is a copolymer of said polymerizable heterocyclic nitrogen base and another polymerizable monomer selected from the group consisting of esters of acrylic and methacrylic acids, styrene, alpha-methyl styrene, ring substituted alkyl styrenes, alkoxy styrenes, acrylonitrile, methacrylonitrile, methyl vinyl ketone, methyl isopropenyl ketone, methyl vinyl ether, vinyl acetates, vinyl chloride, vinylidene chloride, and halogen substituted styrene.

4. A composition according to claim 1 wherein said polymer is a homopolymer of said polymerizable heterocyclic nitrogen base.

5. The method of claim 2 wherein said polymer is a copolymer of said polymerizable heterocyclic nitrogen base and another polymerizable monomer selected from the group consisting of esters of acrylic and methacrylic acids, styrene, alpha-methyl styrene, ring substituted alkyl styrenes, alkoxy styrenes, acrylonitrile, methacrylonitrile, methyl vinyl ketone, methyl isopropenyl ketone, methyl vinyl ether, vinyl acetate, vinyl chloride, vinylidene chloride, and halogen substituted styrene.

6. The method of claim 2 wherein said polymer is a homopolymer of said polymerizable heterocyclic nitrogen base.

7. A polymeric organic composition formed by reacting a copolymer of 2-methyl-5-vinylpyridine and methyl acrylate with benzal chloride, and zinc oxide and magnesium oxide.

8. A polymeric organic composition formed by reacting a copolymer of 2-methyl-5-vinylpyridine and ethyl acrylate with benzal chloride, and zinc oxide.

9. A polymeric organic composition formed by reacting a copolymer of 2-methyl-5-vinylpyridine and methyl acrylate with benzyl chloride, and zinc oxide.

10. A polymeric organic composition formed by reacting a copolymer of 2-methyl-5-vinylpyridine and methyl acrylate with benzyl chloride, and magnesium oxide.

11. A polymeric organic composition formed by reacting a copolymer of 2-methyl-5-vinylpyridine and methyl acrylate with benzyl chloride and PbO.

12. A method comprising reacting a copolymer of 2-methyl-5-vinylpyridine and methyl acrylate with benzal chloride, and zinc oxide and magnesium oxide.

13. A method comprising reacting a copolymer of 2-methyl-5-vinylpyridine and ethyl acrylate with benzal chloride, and zinc oxide.

14. A method comprising reacting a copolymer of 2-methyl-5-vinylpyridine and methyl acrylate with benzyl chloride, and zinc oxide.

15. A method comprising reacting a copolymer of 2-methyl-5-vinylpyridine and methyl acrylate with benzyl chloride and magnesium oxide.

16. A method comprising reacting a copolymer of 2-methyl-5-vinylpyridine and methyl acrylate with benzyl chloride, and PbO.

References Cited in the file of this patent

UNITED STATES PATENTS

| | | |
|---|---|---|
| 2,416,060 | McAlevy et al. | Feb. 18, 1947 |
| 2,631,993 | Morgan | Mar. 17, 1953 |
| 2,654,729 | Price | Oct. 6, 1953 |
| 2,676,952 | Ham | Apr. 27, 1954 |
| 2,848,442 | Svetlik | Aug. 19, 1958 |

OTHER REFERENCES

Rubber Chemicals Division (Du Pont) Report 48–3, June 1948, page 5 relied upon.